(12) United States Patent
Cho et al.

(10) Patent No.: US 12,444,214 B1
(45) Date of Patent: Oct. 14, 2025

(54) AUTHENTICITY SEAL FOR VIDEO SEGMENTS SHOWING A HUMAN SPEAKER

(71) Applicant: Emovid Corporation, Seattle, WA (US)

(72) Inventors: Victor Cho, Burlingame, CA (US);
Rupali Pathania, Redmond, WA (US);
Samuel Nathan Brown, San Francisco, CA (US)

(73) Assignee: Emovid Corporation, Seattle, WA (US)

( * ) Notice: Subject to any disclaimer, the term of this patent is extended or adjusted under 35 U.S.C. 154(b) by 0 days.

(21) Appl. No.: 19/229,872

(22) Filed: Jun. 5, 2025

Related U.S. Application Data (60) Provisional application No. 63/657,470, filed on Jun. 7, 2024.

(51) Int. Cl.
*G06V 20/00* (2022.01)
*G06T 11/60* (2006.01)

(52) U.S. Cl.
CPC ............. *G06V 20/95* (2022.01); *G06T 11/60* (2013.01)

(58) Field of Classification Search
CPC ... G06F 16/9535; G06F 3/0485; G10L 15/26; H04L 51/10; H04N 23/64; H04N 7/14
See application file for complete search history.

(56) References Cited

U.S. PATENT DOCUMENTS

2023/0171484 A1* 6/2023 Dedonato ............... G06F 3/005

* cited by examiner

*Primary Examiner* — Manuchehr Rahmjoo
(74) *Attorney, Agent, or Firm* — Seed Intellectual Property Law Group LLP (57) ABSTRACT

A facility for confirming the authenticity of an audio/video sequence showing a human speaker is described. The facility causes the audio/video sequence to be presented. In connection with presentation of the audio/video sequence, the facility presents a visual indication specifying an extent to which video and/or audio captured from the person was modified to produce the audio/video sequence.

18 Claims, 8 Drawing Sheets

(4 of 8 Drawing Sheet(s) Filed in Color)

AUTHENTICITY SEAL FOR VIDEO SEGMENTS SHOWING A HUMAN SPEAKER

CROSS-REFERENCE TO RELATED APPLICATION(S)

This application claims the benefit of Provisional Application No. 63/657,470, filed Jun. 7, 2024 and entitled "VIDEO AUTHENTICITY SEAL," which is hereby incorporated by reference in its entirety.

In cases where the present application conflicts with a document incorporated by reference, the present application controls.

BACKGROUND

Business people commonly communicate using textual asynchronous digital communication modes such as email and text messages.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The inventors have recognized that human beings are wired to be social creatures and glean significant information from the tone, body language, eye-contact, and demeanor of someone we are interacting with face to face. Unfortunately, with the advent of computing, the internet, and mobile devices, people have shifted significant portions of their communication into digital forms that strip that social and visual information away. In the work environment in particular, companies send billions of e-mails and digital text messages every single hour-all of which rely on a raw text form to communicate effectively. Interestingly, the ability of people to capture and send asynchronous video as a superior, more emotive, more authentic communication channel has been available for decades but is rarely used today.

The inventors have recognized a number of gating factors that discourage users from communicating via asynchronous video. A significant gating factor is a lack of trust about the integrity of recorded video. Recent technological advances have made it possible to (1) generate "deep fake" videos where one person's face and voice have been mapped onto another person, (2) generate facial movement in video from text or an audio sample, or even (3) cause a virtual model of a person to produce video and audio of the person speaking words never actually said by that person, in a way that its artificiality is difficult or impossible to discern.

Given the accelerated pace of development of these AI-driven imaging and 'Deep Fake' technologies, our society at large is beginning to become barraged by a wave of video images and video messages that are difficult to distinguish from reality (e.g., "Is this a real person who recorded this video?") and/or that make one question whether the person you are watching actually recorded the video in question (e.g., "Did Victor really say these things or was this his voice, recreated from an audio sample and some text?").

The inventors seek to deliver authentic video messages that can always be trusted by recipients. To reinforce user confidence in authenticity, they have conceived and reduced to practice a software and/or hardware facility ("the facility") to provide an authenticity seal for video segments showing a human speaker. In various embodiments, this stamp/seal serves a variety of combinations of several objectives:

- By our definition of authenticity through these videos are deemed 'authentic,' which in some embodiments includes at a minimum an original audio recording and 100% of the emotional expression of the person when speaking the words.
- Not requiring the viewer to understand scales, measures, metrics, etc. (e.g., "What does the numerical score '6' or the color signal 'Yellow' mean in terms of authenticity?").
- Clearly showing what specific technology has been applied (e.g., filters).
- Quickly showing what specific content might have been modified, or show whether the background was modified, and whether the hair was modified.
- Clearly communicating whether the speaker's core emotional expression has been maintained, and audio is original.
- Containing a small number of visual elements, such as no more than 3, as the mind can't readily grasp more than 3 things/constructs.
- Confirming that the identity of the person matches the sending source of the message (e.g., if you receive an e-mail from ann.clark@gmail.com, you know that the video came from the facility account associated with that e-mail).

In some embodiments, this involves modifying multiple aspects of the final video (via filters, lighting, hair and outfit changes via the Pajama mode discussed below), sound (noise reduction), background (blurring, changing background), and more. In some embodiments, the system operates with respect to modifications including those described in U.S. patent application Ser. No. 18/735,893, entitled "GENERATIVE FACIAL MAPPING AND BODY BLENDING DURING VIDEO CAPTURE," filed on Jun. 6, 2024 (patent counsel's Docket No. 310262.409), which is hereby incorporated by reference in its entirety. Aspects of such modifications are sometimes referred to herein as "Pajama Mode." In cases where the present application conflicts with the documents incorporated by reference, the present application controls. The combinations could get very complex given how many dimensions are involved-so we use a simple construct to capture all of that complexity yet frame it as authentic, show it simply, and build confidence in the video recipient very quickly.

In various embodiments, the facility's approach involves some or all of:

- Deconstructing an iconographic visualization of authenticity to contain 3 simple elements: The background, the subject's head (which will differentiate between the core facial expression and your hair/etc.), and the words you're speaking (your voice signal)
- Using color tone to change/modify whether these individual elements have been modified, and if so, to what degree.
- Using only two colors, such as green and neutral gray. The color for a given section will be Green if it is 100% complete and unmodified. It will be gray if it has been modified significantly (high-impact changes). Medium-impact changes are either full green or potentially a lighter shade of green. In some embodiments, the facility maintains at a minimum a light green or green face and a light green or green voice signal. In various embodiments, the facility uses a variety of color combinations other than green with gray.
- Definition and manifestation of "face" that splits the hair and halo around the subject's face. When Pajama mode is used, it's possible the subject's hairline/hat/etc. might show up as gray (coming when from a different photo) but the face will stay green.
- While the icon can act as a stand-alone icon, in some embodiment, the user can also display explanatory bullets that describe, at a high level, what tech has been applied, such as via hover text assigned to the Seal icon that says "Filters applied".
- A persistent message "Authenticity verified" that surrounds the seal. In some embodiments, every video in our system has this Seal, creating a continual reinforcement that the person who is showing up in the video is the person in the video AND that our definition of authenticity has been maintained.

The Psychology Behind the Seal:

- Video recipients will receive a mark with some green and a statement of Authenticity Verified". Makes them feel good.
- In some embodiments, people's faces and voices are always either green or light green, reinforcing that with the facility, recording users always stay 'Authentic'. Without saying it explicitly, the facility is training people on the power of their core facial expression and their voice.
- Video creators will receive feedback that their recording is 'green' and also authentic, which makes them feel good.
- Users will have a subtle psychology to be 100% authentic, so that that they can achieve the '100% unmodified' detail. They will slowly push themselves to minimize the 'crutches' we give them.

In some embodiments, the system performs deeper identity verification functions such as:

- Cross-referencing videos with a pre-loaded and verified identity (e.g., Drivers license).
- Incorporating real-time identify verification mechanisms (e.g., send a QR code to your phone, which you need to display before you record).
- Leveraging the large number of identity verification services that are on the market and available as service offerings or embedded technology.

Execution Details Each Used in Some Embodiments:

- The animation plays after the video has loaded. However, the receiving user can press video play button at any time, at which point the video will simply play.
- The animation plays each time the video is loaded and the play button is displayed.
- The animation is or is not played when videos are played in 'all play' mode automatically.
- Three possible manifestations of the seal are:
  - No modifications (all green).
  - Pajama mode (face and mic green, everything else gray)
  - Background modified (face, body, mic green, background gray).
- Hover text:
  - In some embodiments, the facility shows three potential text blurbs if you hover over the icon:
    - 100% original video-No filters/smoothing applied. Video is completely unmodified.
    - Light filters applied-Background blurred, face smoothing. applied, lighting changed.
    - "Pajama mode" applied-Background, hair, and clothing replaced; makeup blended in.

In various embodiments, the facility uses a variety of other hover text strings.

By performing in some or all of the ways described above, the facility enables a recording user receiving a recorded video to be confident that they are fully apprised of which aspects of the video authentically reflect attributes and behaviors of the recording user. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. In particular, the facility prevents the expenditure of additional computing and network communication resources on additional communications to ascertain what attributes and behaviors of the sending user may have been altered.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc.

Figure 1:
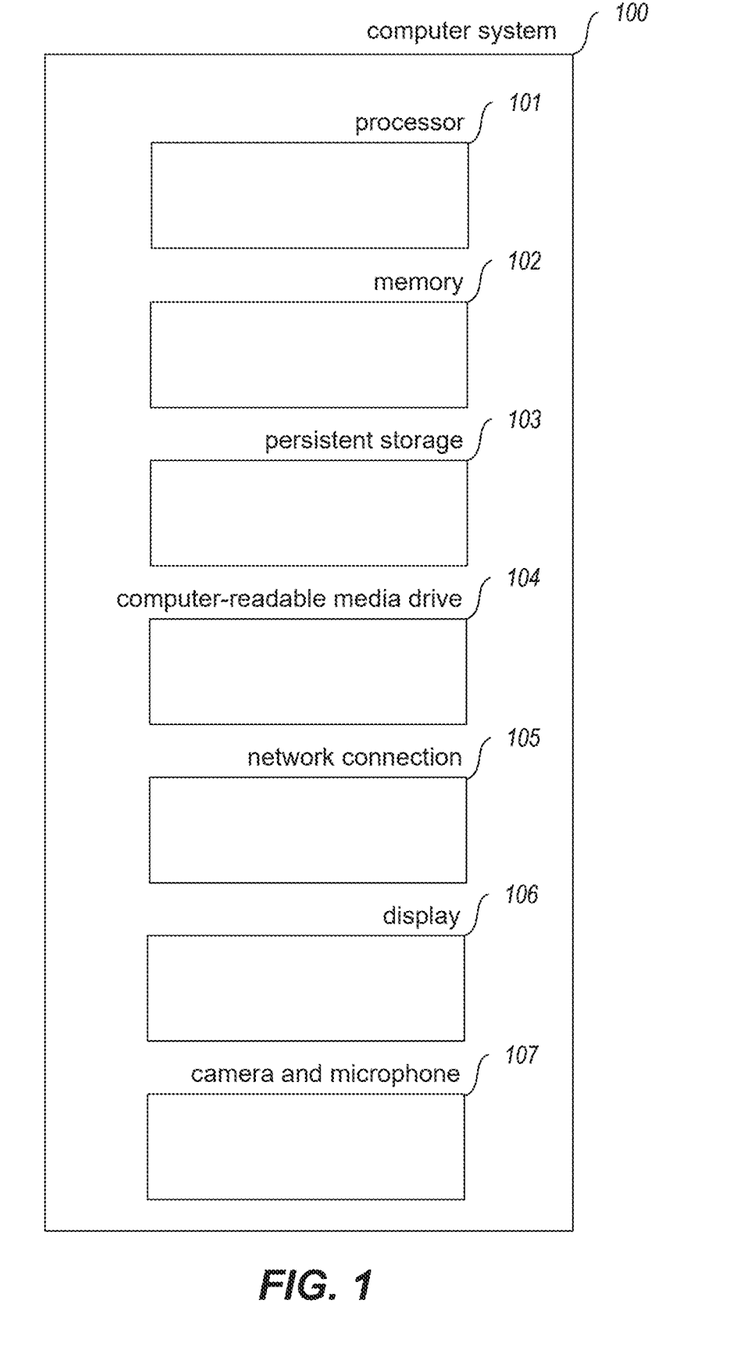
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102—such as RAM, SDRAM, ROM, PROM, etc.—for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a display 106 for displaying visual information or data to a user; and a video camera and audio capture device 107 for recording a visual and audio stream in real-time from a user. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

In some embodiments, in certifying user identity and/or degree of modification, the facility relies on a determination that video for the audio/video sequence was produced by a camera or other image or video capture device connected to the computing system, and only subsequently modified to the degree certified by the facility. In various embodiments, this involves receiving the video via the computing device's operating system, such as via a driver or device interface used by the operating system to communicate with, control, and receive data from this input device; asking the user to take some obscure action while or before recording the video, and detecting it in the subsequent video signal; etc. Similarly, in some embodiments, the facility relies on a determination that the audio for the audio/video sequence was produced by a microphone or other capture device connected to the computing system, and only subsequently modified to the group degree certified by the facility. In various embodiments, this involves receiving the audio via the computing device's operating system, such as via a driver or device interface used by the operating system to communicate with, control, and receive data from this input device; asking the user to speak some obscure sequence of words while or before recording the video, and detecting it in the subsequent audio signal; etc.

Figure 2:
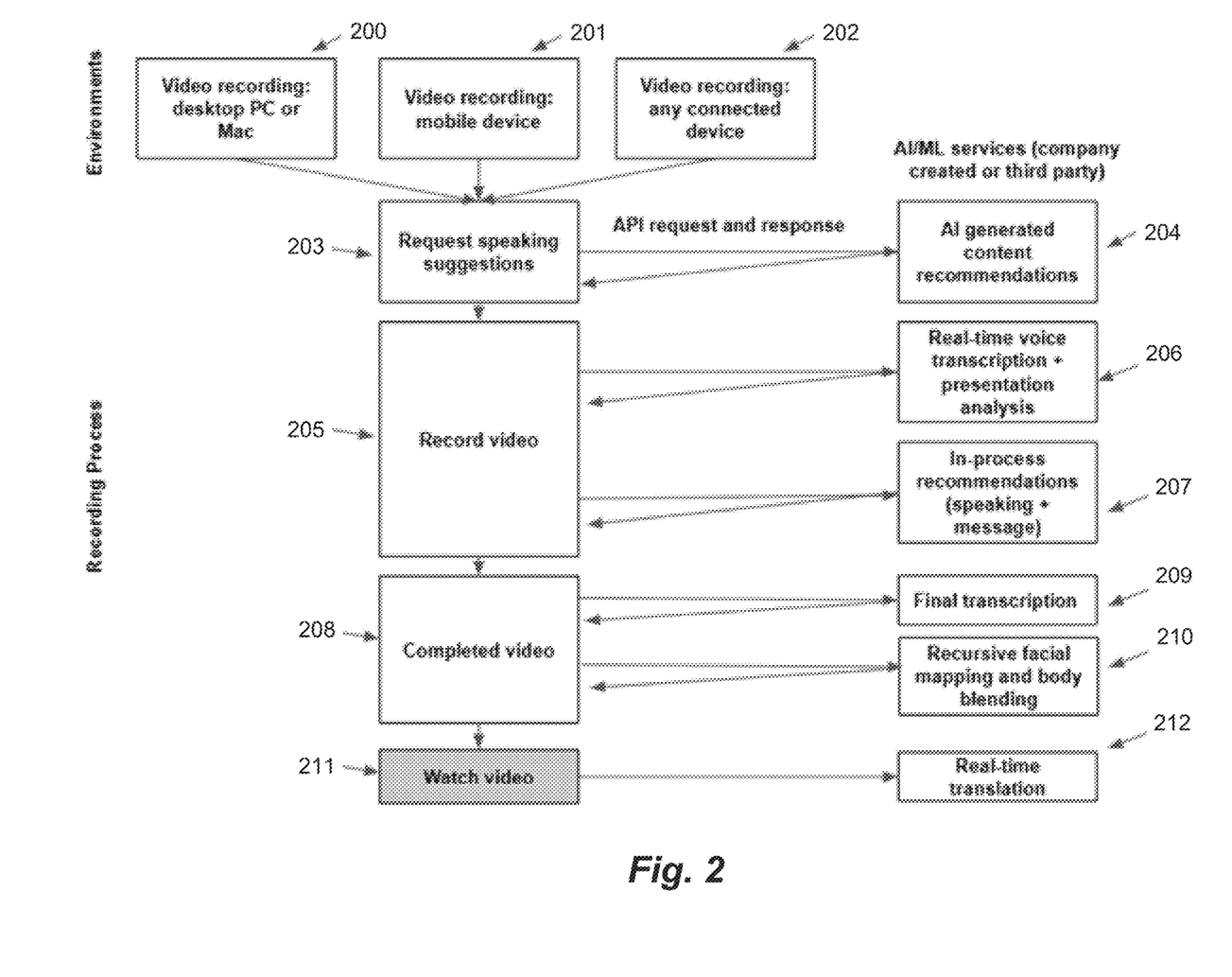
FIG. 2 is a flow diagram showing a process performed by the facility in some embodiments to record a video of a sending user to be viewed by a receiving user.

FIG. 2 is a flow diagram showing a process performed by the facility in some embodiments to record a video of a sending user to be viewed by a receiving user. A user first triggers a video recording session in one of multiple connected computing environments, such as a desktop computer 200, a mobile device 201, or a generic connected computing device 202. In act 203, the facility prompts the user sending with the option to receive real-time speaking suggestions. In some embodiments, the sending user types or verbalizes a speaking help request into a text input form. In act 204, the facility takes the request inputs along with other unique context setting data and constraints and triggers a real-time call to a first- or third-party recommendation, algorithm, Large Language Model (LLM), or equivalent. In some embodiments, the facility makes this call to a Large Language Model such as GPT-3.5 or GPT-4 from Open AI, Inc.

In some embodiments, request takes the form of an API call which includes the following parameters as of the date of this submission: (1) the specific model used; (2) the now modified request to be processed; (3) temperature/randomizer parameters to define the response range; (4) length restrictions for the final output; and (5) other parameters that impact the response range. A speaking recommendation is served back from the recommendation engine and then displayed by the instantiating device or client. In some embodiments, the facility's generation and presentation of this speaking recommendation script is as described in U.S. patent application Ser. No. 18/617,384 filed on Mar. 26, 2024, entitled "REAL-TIME AI-DRIVEN SPEAKING SUGGESTIONS DURING ASYNCHRONOUS VIDEO CAPTURE," which is hereby incorporated by reference in its entirety.

In some embodiments, the sending user instantiates a video recording 205. The resulting video stream is interpreted in real-time by a set of first- or third-party services that extract the text transcript from the video and perform a real-time analysis of the visual presentation in terms of speaking confidence, tone, presence, clarity, and more 206. In some embodiments, the facility sends back speaking or stylistic recommendations on how the user can improve their presentation 207. Once the video recording is stopped by the sending user 208 a final transcription is provided 209. In some embodiments, the user then chooses to transform this video 210 using a generative facial mapping and body blending function provided by the facility, which results in a new, blended video that maintains the facial and voice nuance of the originally recorded video, but merged with the background, hair, and body provided through a previously recorded video of the same individual. The sending user then sends this video to one or more recipients who then watch the video 211 with an authenticity seal appropriate to any alterations made by the facility or the recording user. In some embodiments, the recipient user reads the previously transcribed final transcription in parallel to watching the video or requests a real-time language translation into an alternative language, which is provided by a first- or third-party translation engine 211.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
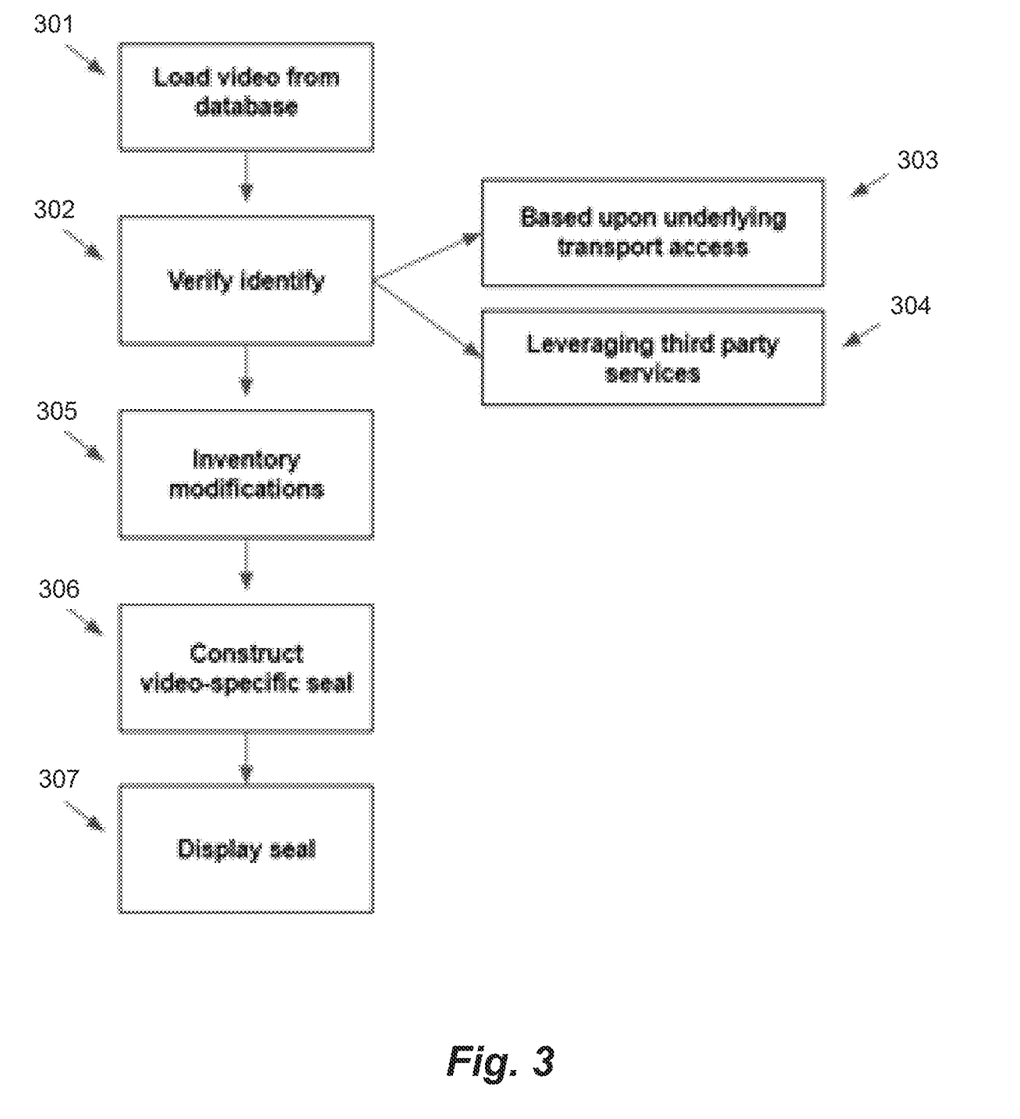
FIG. 3 is a flow diagram showing a process performed by the facility in some embodiments to apply the authenticity seal to the recorded video.

FIG. 3 is a flow diagram showing a process performed by the facility in some embodiments to apply the authenticity seal to the recorded video. A video can be rendered on any number of different pages or screen, such as a web page, a mobile app page, an embedded video within a third-party site, e.g., LinkedIn. In act 301, the facility identifies and loads the full video. In act 302, the facility performs an identity check to ensure that the identity of the sending user is verified. In some cases 303, this simply happens via authentication that has already occurred based on the user's social login, e-mail login, phone #access, etc. So for instance, if you are logging into the facility with your name@gmail.com account, the facility knows that only the person with access to the name@gmail.com account can upload or send a video. In some embodiments, the facility uses additional potentially real-time verification of identity, such as act 304 calling various third-party identity verification sites or services that may further validate using real-time QR code capture, real-time facial recognition, biometric identification, or other parallel technologies.

In act 305, the facility identifies all of the modifications that have been made to the video vs. the original video when it was originally recorded. These modifications can include changes to lighting and contrast levels, the application of facial filters like smoothing or blemish removal, the application of animation overlays, blurring or replacement of the background behind the speaker, camera lens distortion fixes that adjust for lens distortion, noise reduction filters on the audio, and more. Modifications can also include the application of 'pajama mode' where we have taken a base-level image or video and effectively remapped the original video into a different 'persona'.

In act 306, depending on which of these different elements had been used in this video, the facility constructs a version of the seal specific to this video, such as by using the layered build-up approach described above.

In act 307, the system displays that seal to the video watcher, such as in a way that informs them the video has been verified before they play the video. In some embodiments, this takes the form of a transparent seal that sits on top of the video thumbnail in any number of locations or sizes in the future (outside of the video window, in a slightly different visual version (square vs. round), etc.) In some embodiments, when the video watcher clicks 'play,' the authenticity seal is removed and the video viewer is allowed to watch the video cleanly. In some embodiments, the authenticity seal persists even during video watch (e.g., sitting below the video, for instance).

Figure 4:
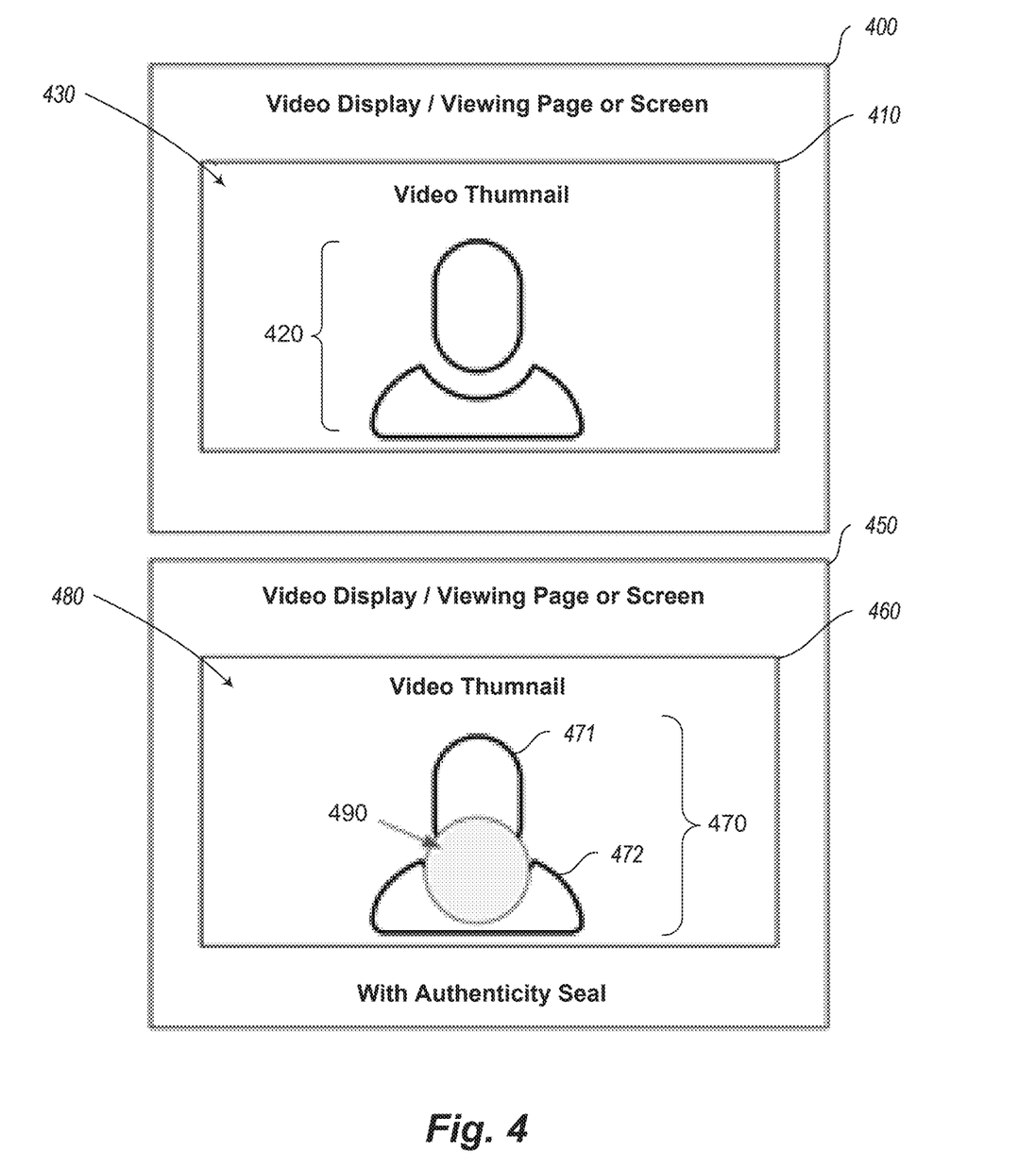
FIG. 4 shows two display diagrams reflecting the facility's application of an authenticity seal to a video being presented.

FIG. 4 shows two display diagrams reflecting the facility's application of an authenticity seal to a video being presented. A first display 400 shows the presentation of a video without application of an authenticity seal, while the second display 450 shows the presentation of a video with an authenticity seal presented. In the first display 400, a video including a person 420 and a visual background 430 is played in a video window 410. The person includes a head 421, and upper torso 422.

The second display 450 includes these elements, as well as an authenticity seal 490. In various embodiments, the authenticity seal takes various forms, including those shown in FIGS. 5-7 discussed below.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 5:
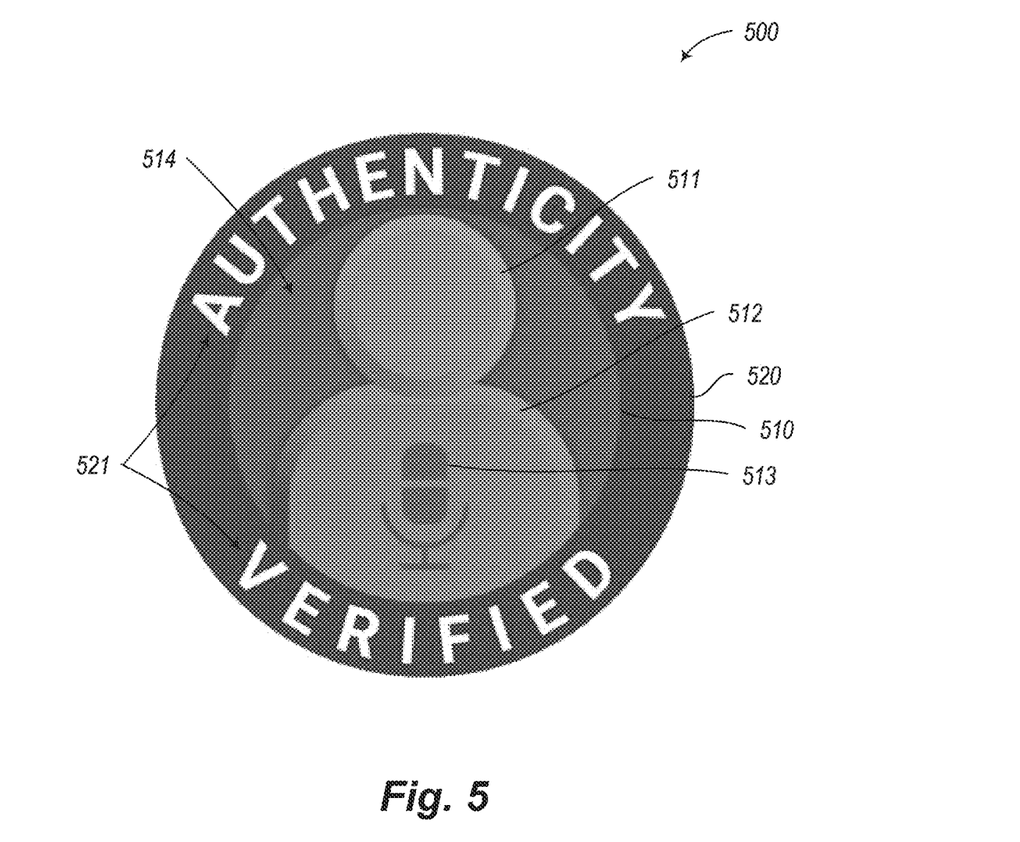
FIG. 5 is a display diagram showing a first sample authenticity seal presented by the facility in some embodiments.

FIG. 5 is a display diagram showing a first sample authenticity seal presented by the facility in some embodiments. This authenticity seal 500 reflects that the video has been completely unmodified. In some embodiments, its caption or hover text is "100% unmodified video." The authenticity seal includes a circle 510, surrounded by a ring 520. The circle includes a head 511, which is green to show that the face is unmodified. It also contains a torso 512 containing a microphone 513, which is green to indicate that the torso is unmodified. The microphone 513 is green to show that the audio is unmodified. The circle also includes a visual background 514, which is green to indicate that the background is unmodified. The ring contains the text "authenticity verified" 521, indicating that the person in the video has been identified as the sender and, in some embodiments, that the video is authentic.

In some embodiments, the facility uses the authenticity seal 500 shown in FIG. 5 to reflect videos having other characters, such as (1) a video in which light facial smoothing has been applied (such as with caption or hover text: "light filters applied"); or (2) video with light background blur applied (such as with caption or hover text: "light filters applied").

In some embodiments (not shown), an authenticity seal similar to authenticity seal 500 shown in FIG. 5 is determined by the facility for a video that has had heavy facial smoothing applied. This authenticity seal differs from authenticity seal 500 in that the face 511 is shown in a lighter shade of green, with the caption or hover text is "filters applied."

Figure 6:
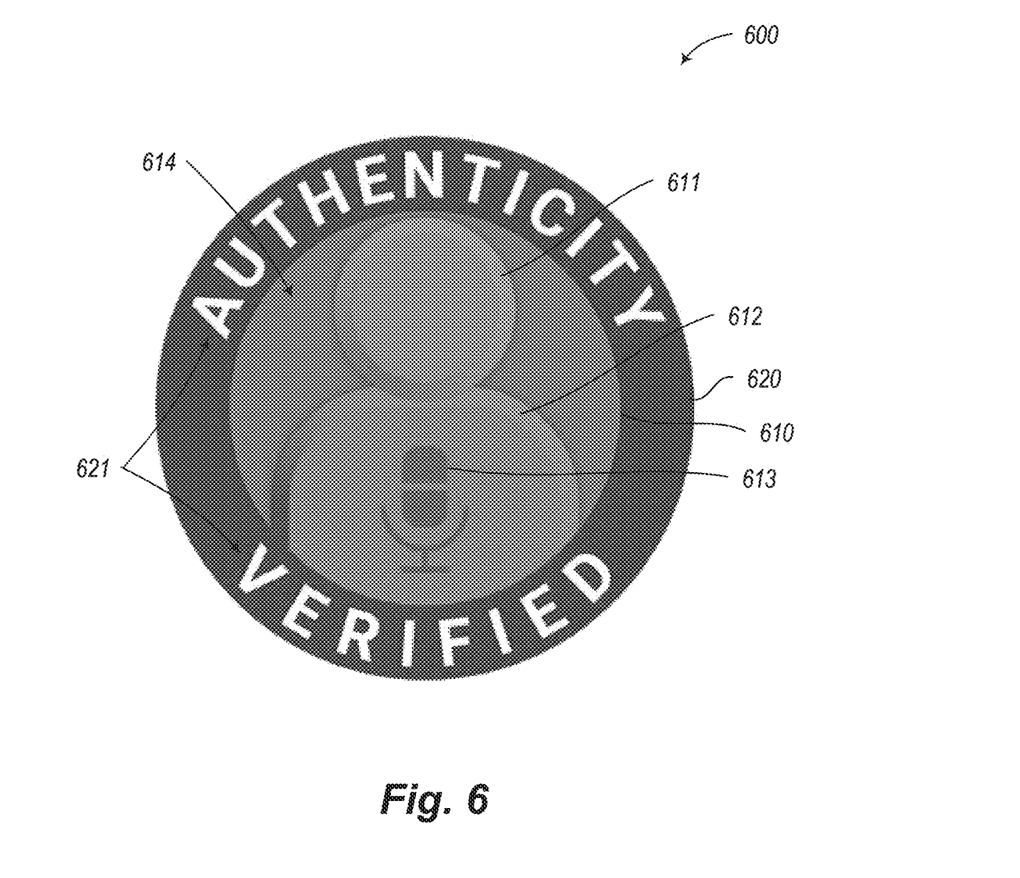
FIG. 6 is a display diagram showing a second sample authenticity seal presented by the facility in some embodiments.

FIG. 6 is a display diagram showing a second sample authenticity seal presented by the facility in some embodiments. The authenticity seal 600 reflects a video having aggressive background blur, or a background replaced with an alternative image. Unlike the authenticity seal shown in FIG. 5, the background 614 of authenticity seal 600 is gray to reflect this significant alteration of the background.

Figure 7:
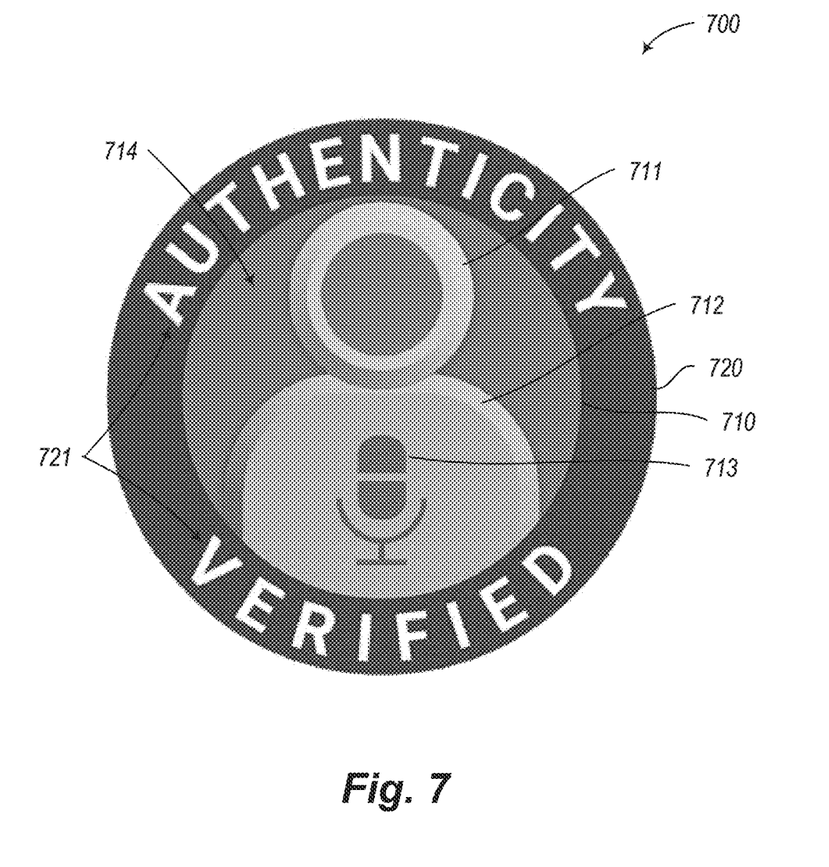
FIG. 7 is a display diagram showing a third sample authenticity seal presented by the facility in some embodiments.

FIG. 7 is a display diagram showing a third sample authenticity seal presented by the facility in some embodiments. Authenticity seal 700 reflects a video processed with Pajama mode, in which the background, hair, and clothing are replaced from a halo image and blended. Here, the torso 712 and background 714 are gray, as is a halo 715 around the green head 711. The caption or hover text is "Pajama mode applied" or "business persona applied" or "recorded face merged with earlier image of sender."

Figure 8:
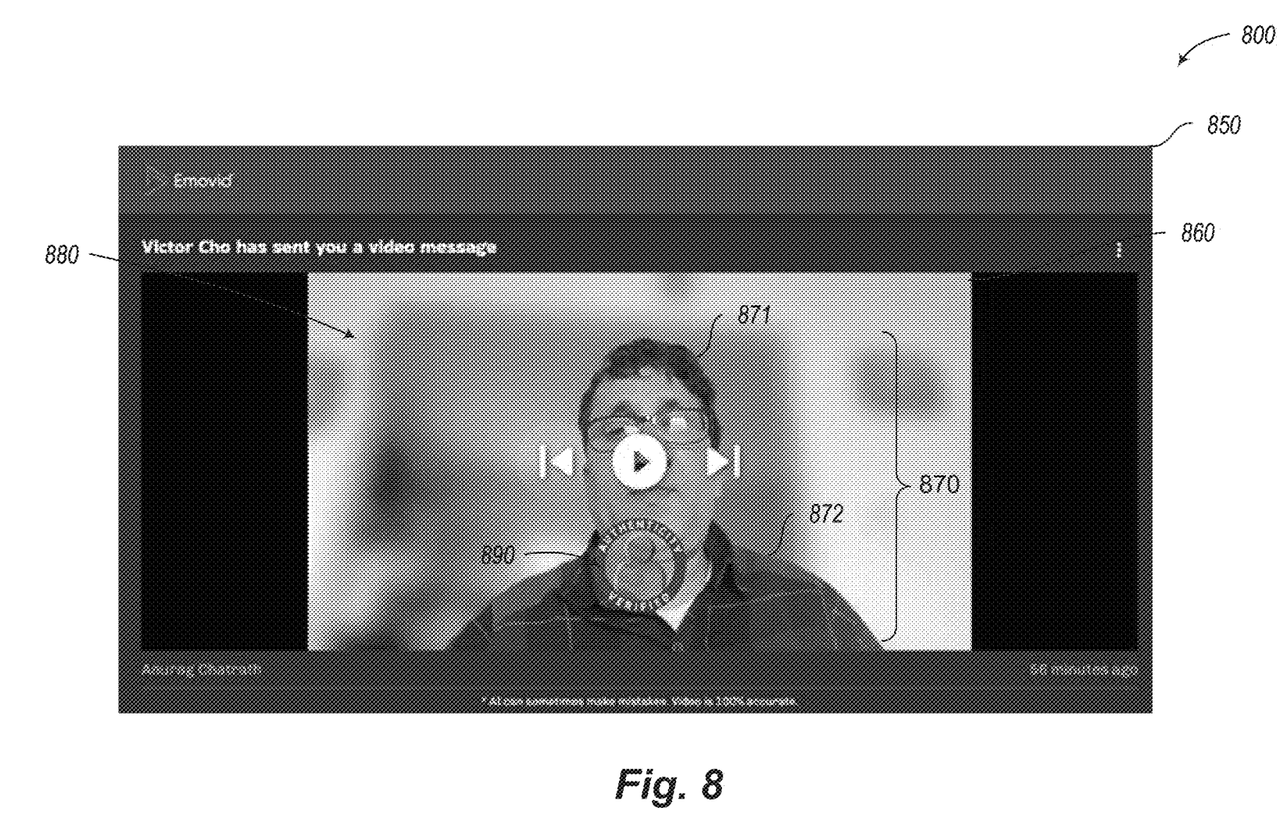
FIG. 8 is a display diagram showing the application of an authenticity seal to a particular video recording.

FIG. 8 is a display diagram showing the application of an authenticity seal to a particular video recording. In the video window 860 of the display 800, the background 880 is blurred, and the rest of the video, including head 871 and upper torso 872 of the person 870 is unmodified. Accordingly, the authenticity seal 890 has a gray and/or uncolored translucent background region, and green head and torso regions, similar to the authenticity seal shown in FIG. 6.

Various approaches to constructing and applying the seal include:

Visually displaying the authenticity level of a digital video based upon whether the core emotional nuances of a person's face and voice have been maintained from some original recording by that same person, even if the video has been modified superficially by the application of filters, lighting, or even a remapping of elements from a previous photo or image of that person (in which case hair, outfit, make-up, etc. might be modified). But in all instances, the original emotional and vocal expression are maintained.

Having a single visual seal that represents a combination of authenticity and identity verification. Because the facility real-time captured the video and the user has had to authenticate their identity through some alternative means such as social sign-in, e-mail verification, or future identity verification processes like bio-metrics, etc., the facility can verify that the underlying identity matches that of the video sender.

Having a layered and changing visual seal that changes underlying elements based on what aspect of the underlying image has been modified or changed (face, voice, background, hair and clothes, etc.), such that the seal itself provides a quick snapshot view of what has been modified.

Transparently disclosing how a given area has been modified when the user clicks on or mouses over the seal, so that the recipient of the video can clearly see what very specific technologies or approaches have been applied (e.g., filters have been applied).

Showing this seal as an overlay before any video is played, reinforcing that the video about to be watched is both authentic and that the identify has been verified.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more networking hardware components through which a video sequence data structure is transiting, the data structure comprising:
   a first portion specifying a first audio sequence comprising natural language speech, the first audio sequence corresponding to a second video sequence captured by a microphone;
   a second portion specifying a first video sequence synchronized with the first audio sequence of the first portion, the first video sequence corresponding to a second video sequence captured by an image sensor, the second portion comprising a plurality of video frames, each frame comprising:
      a first region containing an image of at least the head of a person speaking at a point in the audio sequence corresponding to a position of the frame in the first video sequence, the head comprising hair;
      a second region containing a background at least partially surrounding the image of at least the head of a person; and
      a third region containing a visual indication, the visual indication comprising:
         a first subregion having an appearance that indicates whether the second region has been altered in the first video sequence, relative to the second video sequence;
         a second subregion having an appearance that indicates whether the hair has been altered in the first video sequence, relative to the second video sequence; and
         a third subregion having an appearance that indicates whether the first audio sequence has been altered, relative to the second audio sequence.

2. The one or more networking hardware components of claim 1 wherein the first region further includes a torso of the person,
   the appearance of the third subregion further indicating whether the torso has been altered in the first video sequence, relative to the second video sequence.

3. The one or more networking hardware components of claim 1 wherein the first subregion, second subregion, and/or third subregion indicates a degree of alteration.

4. The one or more networking hardware components of claim 1 wherein the first, second, and third subregions indicate alteration via hue.

5. The one or more networking hardware components of claim 1 wherein the first, second, and third subregions indicate alteration via tint or shade.

6. The one or more networking hardware components of claim 1, the data structure further comprising:
   a third portion having contents configured to cause a visual indication of an identity confirmed for a person—from whom the second video sequence was captured by an image sensor and from whom the second audio sequence was captured by a microphone—to be displayed when the first video sequence and first audio sequence are played.

7. One or more memories collectively sustaining a video sequence data structure, the data structure comprising:
   a first portion specifying a first audio sequence comprising natural language speech, the first audio sequence corresponding to a second video sequence captured by a microphone;
   a second portion specifying a first video sequence synchronized with the first audio sequence of the first portion, the first video sequence corresponding to a second video sequence captured by an image sensor, the second portion comprising a plurality of video frames, each frame comprising:
      a first region containing an image of at least the head of a person speaking at a point in the audio sequence corresponding to a position of the frame in the first video sequence, the head comprising hair;
      a second region containing a background at least partially surrounding the image of at least the head of a person; and
      a third region containing a visual indication, the visual indication comprising:
         a first subregion having an appearance that indicates whether the second region has been altered in the first video sequence, relative to the second video sequence;
         a second subregion having an appearance that indicates whether the hair has been altered in the first video sequence, relative to the second video sequence; and
         a third subregion having an appearance that indicates whether the first audio sequence has been altered, relative to the second audio sequence.

8. The one or more memories of claim 7 wherein the first region further includes a torso of the person,
   the appearance of the third subregion further indicating whether the torso has been altered in the first video sequence, relative to the second video sequence.

9. The one or more memories of claim 7 wherein the first subregion, second subregion, and/or third subregion indicates a degree of alteration.

10. The one or more memories of claim 7 wherein the first, second, and third subregions indicate alteration via hue.

11. The one or more memories of claim 7 wherein the first, second, and third subregions indicate alteration via tint or shade.

12. The one or more memories of claim 7, the data structure further comprising:
   a third portion having contents configured to cause a visual indication of an identity confirmed for a person—from whom the second video sequence was captured by an image sensor and from whom the second audio sequence was captured by a microphone—to be displayed when the first video sequence and first audio sequence are played.

13. A method in a first computing system, the method comprising:
   transmitting to a second computing system a video sequence data structure, comprising:
      a first portion specifying a first audio sequence comprising natural language speech, the first audio sequence corresponding to a second video sequence captured by a microphone;
      a second portion specifying a first video sequence synchronized with the first audio sequence of the first portion, the first video sequence corresponding to a second video sequence captured by an image sensor, the second portion comprising a plurality of video frames, each frame comprising:
         a first region containing an image of at least the head of a person speaking at a point in the audio sequence corresponding to a position of the frame in the first video sequence, the head comprising hair;
         a second region containing a background at least partially surrounding the image of at least the head of a person; and
         a third region containing a visual indication, the visual indication comprising:
            a first subregion having an appearance that indicates whether the second region has been altered in the first video sequence, relative to the second video sequence;
            a second subregion having an appearance that indicates whether the hair has been altered in the first video sequence, relative to the second video sequence; and
            a third subregion having an appearance that indicates whether the first audio sequence has been altered, relative to the second audio sequence.

14. The method of claim 13 wherein the first region further includes a torso of the person,
   the appearance of the third subregion further indicating whether the torso has been altered in the first video sequence, relative to the second video sequence.

15. The method of claim 13 wherein the first subregion, second subregion, and/or third subregion indicates a degree of alteration.

16. The method of claim 13 wherein the first, second, and third subregions indicate alteration via hue.

17. The method of claim 13 wherein the first, second, and third subregions indicate alteration via tint or shade.

18. The method of claim 13, the data structure further comprising:
   a third portion having contents configured to cause a visual indication of an identity confirmed for a person—from whom the second video sequence was captured by an image sensor and from whom the second audio sequence was captured by a microphone—to be displayed when the first video sequence and first audio sequence are played.

* * * * *